(12) United States Patent
Bhasin

(10) Patent No.: US 12,169,839 B2
(45) Date of Patent: Dec. 17, 2024

(54) COMPUTER-IMPLEMENTED METHOD, SYSTEM, AND COMPUTER PROGRAM PRODUCT FOR AUTHENTICATING A TRANSACTION

(71) Applicant: Visa International Service Association, San Francisco, CA (US)

(72) Inventor: Gurpreet Singh Bhasin, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 92 days.

(21) Appl. No.: 17/632,889

(22) PCT Filed: Aug. 8, 2019

(86) PCT No.: PCT/US2019/045673
§ 371 (c)(1),
(2) Date: Feb. 4, 2022

(87) PCT Pub. No.: WO2021/025698
PCT Pub. Date: Feb. 11, 2021

(65) Prior Publication Data
US 2022/0270096 A1      Aug. 25, 2022

(51) Int. Cl.
*G06Q 20/40*    (2012.01)
*G06Q 20/32*    (2012.01)
*G06Q 20/38*    (2012.01)

(52) U.S. Cl.
CPC ..... *G06Q 20/4015* (2020.05); *G06Q 20/3224* (2013.01); *G06Q 20/3226* (2013.01); *G06Q 20/389* (2013.01)

(58) Field of Classification Search
CPC .......... G06Q 20/4015; G06Q 20/3224; G06Q 20/3226; G06Q 20/389
See application file for complete search history.

(56) References Cited

U.S. PATENT DOCUMENTS 7,594,605 B2 * 9/2009 Aaron .................... G06Q 20/34
                                                        235/382
9,922,323 B2    3/2018 Buhrmann et al.
(Continued)

OTHER PUBLICATIONS

B. Akoramurthy and J. Arthi, "GeoMoB—A geo location based browser for secured mobile banking," 2016 Eighth International Conference on Advanced Computing (ICoAC), Chennai, India, 2017, pp. 83-88, doi: 10.1109/ICoAC.2017.7951750. (Year: 2017).*
(Continued)

*Primary Examiner* — David P Sharvin
*Assistant Examiner* — Steven R Chism
(74) *Attorney, Agent, or Firm* — The Webb Law Firm

(57) ABSTRACT

A computer-implemented method, system, and computer program product is provided for authenticating a transaction. The method includes: receiving, on a mobile device associated with a user, a request from an authentication system, the request associated with a transaction requested by the user; obtaining, with the mobile device from a portable payment device, account data via radio frequency communication; obtaining, with the mobile device, mobile device location data including at least one of the following: GPS location data, telephone carrier location data, wireless network location data, or any combination thereof; encrypting, with the mobile device, at least a portion of the account data and the mobile device location data, resulting in at least one encrypted data packet; and transmitting, with the mobile device to the authentication system, the at least one encrypted data packet.

3 Claims, 7 Drawing Sheets

(56) References Cited

U.S. PATENT DOCUMENTS

| | | |
|---|---|---|
| 10,168,413 B2 | 1/2019 | Annamalai et al. |
| 2010/0005013 A1* | 1/2010 | Uriarte .................. G06Q 30/02 |
| | | 705/30 |
| 2010/0024017 A1 | 1/2010 | Ashfield et al. |
| 2012/0209773 A1 | 8/2012 | Ranganathan |
| 2014/0258135 A1 | 9/2014 | Park et al. |
| 2015/0294304 A1* | 10/2015 | Donnellan ......... G06Q 20/3278 |
| | | 705/44 |
| 2016/0127600 A1 | 5/2016 | Beatty |
| 2016/0321653 A1 | 11/2016 | Jacobs et al. |
| 2017/0236113 A1* | 8/2017 | Chitalia ................ H04W 4/023 |
| | | 705/44 |
| 2018/0307823 A1 | 10/2018 | Parry et al. |
| 2020/0169874 A1* | 5/2020 | Wagner ................. H04W 12/06 |
| 2023/0106418 A1* | 4/2023 | Asefi .................. G06Q 20/3276 |
| | | 705/44 |

OTHER PUBLICATIONS

E. I. Tatly, D. Stegemann and S. Lucks, "Security Challenges of Location-Aware Mobile Business," Second IEEE International Workshop on Mobile Commerce and Services, Munich, Germany, 2005, pp. 84-95, doi: 10.1109/WMCS.2005.23. (Year: 2005).*

* cited by examiner

COMPUTER-IMPLEMENTED METHOD, SYSTEM, AND COMPUTER PROGRAM PRODUCT FOR AUTHENTICATING A TRANSACTION

CROSS-REFERENCE TO RELATED APPLICATION

This application is the United States national phase of International Application No. PCT/US2019/045673 filed Aug. 8, 2019 the entire disclosure of which is hereby incorporated by reference in its entirety.

BACKGROUND

1. Field

This disclosure relates generally to authenticating transactions and, in non-limiting embodiments, computer-implemented methods, systems, and computer program products for authenticating transactions.

2. Technical Considerations

Card-not-present (CNP) transaction fraud is a type of payment device (e.g., credit card) fraud in which the card thief does not physically present the card to the merchant during the fraudulent transaction. For example, CNP transaction fraud can occur when the card thief initiates an online transaction. Detecting and preventing CNP transaction fraud can present certain challenges compared to card-present transaction fraud.

Authentication systems use various filters in an attempt to detect CNP transaction fraud. One of the variables used by authentication systems is an internet protocol (IP) address of the device initiating the transaction. The IP address gives broad locational information about the user and can increase or decrease the risk associated with payment acceptance, depending on whether the IP address follows prior successful payment authorizations, for instance.

However, IP addresses can easily be spoofed using known IP address spoofing techniques, by using a virtual private network (VPN), or by using an Onion browser/Tor network connection that gives a false IP address. As one example, a foreign credit card thief can buy a credit card number of an American citizen on the dark web and use a US-based VPN to make a purchase. In this scenario, the authentication system would only see an IP address of a purportedly US-based device. Therefore, IP address information alone is not necessarily a reliable source of a user's location

SUMMARY

According to non-limiting embodiments or aspects, provided is a computer-implemented method for authenticating a transaction, including: receiving, on a mobile device associated with a user, a request from an authentication system, the request associated with a transaction requested by the user; obtaining, with the mobile device from a portable payment device, account data via radio frequency communication; obtaining, with the mobile device, mobile device location data including at least one of the following: GPS location data, telephone carrier location data, wireless network location data, or any combination thereof; encrypting, with the mobile device, at least a portion of the account data and the mobile device location data, resulting in at least one encrypted data packet; and transmitting, with the mobile device to the authentication system, the at least one encrypted data packet.

In non-limiting embodiments or aspects, the method may further include: receiving, at the authentication system, the at least one encrypted data packet; decrypting, at the authentication system, the at least one encrypted data packet to obtain the mobile device location data; comparing the mobile device location data with location data associated with a network address of the mobile device; and determining, at the authentication system, a risk assessment based on the comparison between the mobile device location data and the location data associated with the network address of the mobile device. The network address may include an Internet Protocol address, and the network address may be obtained by the authentication system from a transaction request message transmitted from the mobile device to initiate the transaction. The at least one encrypted data packet may be encrypted based on a public key associated with the authentication system. The public key associated with the authentication system may be stored on the mobile device and/or received in the request. The method may further include: in response to receiving the request from the authentication system, prompting a user of the mobile device to arrange the portable payment device in proximity to the mobile device, where the account data is obtained via near-frequency communication (NFC). The at least one encrypted data packet and the transaction request message may each include a timestamp, and determining the risk assessment based on the comparison between the mobile device location data and the location data associated with the network address of the mobile device may include: determining, based on the timestamps, a radius associated with the location data associated with the network address of the mobile device; and determining whether the mobile device location data is within the radius.

According to non-limiting embodiments or aspects, provided is a system for authenticating a transaction, including at least one processor programmed or configured to: receive, on a mobile device associated with a user, a request from an authentication system, the request associated with a transaction requested by the user; obtain, with the mobile device from a portable payment device, account data via radio frequency communication; obtain, with the mobile device, mobile device location data including at least one of the following: GPS location data, telephone carrier location data, wireless network location data, or any combination thereof; encrypt, with the mobile device, at least a portion of the account data and the mobile device location data, resulting in at least one encrypted data packet; and transmit, with the mobile device to the authentication system, the at least one encrypted data packet.

In non-limiting embodiments or aspects, the at least one processor may be further programmed or configured to: receive, at the authentication system, the at least one encrypted data packet; decrypt, at the authentication system, the at least one encrypted data packet to obtain the mobile device location data; compare the mobile device location data with location data associated with a network address of the mobile device; and determine, at the authentication system, a risk assessment based on the comparison between the mobile device location data and the location data associated with the network address of the mobile device. The network address may include an Internet Protocol address, and the network address may be obtained by the authentication system from a transaction request message transmitted from the mobile device to initiate the transaction. The at least one encrypted data packet may be encrypted based on a public key associated with the authentication system. The public key associated with the authentication system may be stored on the mobile device and/or received in the request. The at least one processor may be further programmed or configured to: in response to receiving the request from the authentication system, prompt a user of the mobile device to arrange the portable payment device in proximity to the mobile device, where the account data is obtained via near-frequency communication (NFC). The at least one encrypted data packet and the transaction request message may each include a timestamp, and determining the risk assessment based on the comparison between the mobile device location data and the location data associated with the network address of the mobile device may include: determining, based on the timestamps, a radius associated with the location data associated with the network address of the mobile device; and determining whether the mobile device location data is within the radius.

According to non-limiting embodiments or aspects, provided is a computer program product for authenticating a transaction, the computer program product including at least one non-transitory computer-readable medium including one or more instructions that, when executed by at least one processor, cause the at least one processor to: receive, on a mobile device associated with a user, a request from an authentication system, the request associated with a transaction requested by the user; obtain, with the mobile device from a portable payment device, account data via radio frequency communication; obtain, with the mobile device, mobile device location data including at least one of the following: GPS location data, telephone carrier location data, wireless network location data, or any combination thereof; encrypt, with the mobile device, at least a portion of the account data and the mobile device location data, resulting in at least one encrypted data packet; and transmit, with the mobile device to the authentication system, the at least one encrypted data packet.

In non-limiting embodiments or aspects, the one or more instructions may cause the at least one processor to: receive, at the authentication system, the at least one encrypted data packet; decrypt, at the authentication system, the at least one encrypted data packet to obtain the mobile device location data; compare the mobile device location data with location data associated with a network address of the mobile device; and determine, at the authentication system, a risk assessment based on the comparison between the mobile device location data and the location data associated with the network address of the mobile device. The network address may include an Internet Protocol address, and the network address may be obtained by the authentication system from a transaction request message transmitted from the mobile device to initiate the transaction. The at least one encrypted data packet may be encrypted based on a public key associated with the authentication system. The public key associated with the authentication system may be stored on the mobile device and/or received in the request. The one or more instructions may cause the at least one processor to: in response to receiving the request from the authentication system, prompt a user of the mobile device to arrange the portable payment device in proximity to the mobile device, where the account data is obtained via near-frequency communication (NFC). The at least one encrypted data packet and the transaction request message may each include a timestamp, and determining the risk assessment based on the comparison between the mobile device location data and the location data associated with the network address of the mobile device may include: determining, based on the timestamps, a radius associated with the location data associated with the network address of the mobile device; and determining whether the mobile device location data is within the radius.

According to non-limiting embodiments or aspects, provided is a computer-implemented method for authenticating a transaction, including: receiving, at an authentication system, a transaction initiation message associated with a transaction, where the transaction initiation message includes first location data associated with a network address of a mobile device used to initiate the transaction; generating and communicating, at the authentication system, a challenge message to the mobile device; receiving, at the authentication system and from the mobile device, at least one encrypted data packet including encrypted account data associated with a portable payment device obtained from the mobile device via radio frequency communication and encrypted second location data obtained by the mobile device by at least one of the following: GPS location data, telephone carrier location data, wireless network location data, or any combination thereof; comparing, at the authentication system, the second location data with the first location data; and determining, at the authentication system, a risk assessment based on the comparison between the second location data and the first location data.

In non-limiting embodiments or aspects, the method may further include: decrypting, at the authentication system, the at least one encrypted data packet to obtain the second location data. The network address may include an Internet Protocol address. The at least one encrypted data packet may be encrypted based on a public key associated with the authentication system. The public key associated with the authentication system may be stored on the mobile device and/or received in the challenge message. The challenge message may prompt the user of the mobile device to arrange the portable payment device in proximity to the mobile device, where the account data may be obtained via near-frequency communication (NFC). The at least one encrypted data packet and the transaction initiation message may each comprise a timestamp, and determining the risk assessment based on the comparison between the second location data and the first location data may include: determining, based on the timestamps, a radius associated with first location data; and determining whether the second location data is within the radius. The transaction initiation message may include account data associated with the portable payment device, where the authentication system may compare the account data associated with the portable payment device from the transaction initiation message with the account data from the at least one encrypted data packet.

Other non-limiting embodiments or aspects will be set forth in the following numbered clauses:

Clause 1: A computer-implemented method for authenticating a transaction, comprising: receiving, on a mobile device associated with a user, a request from an authentication system, the request associated with a transaction requested by the user; obtaining, with the mobile device from a portable payment device, account data via radio frequency communication; obtaining, with the mobile device, mobile device location data comprising at least one of the following: GPS location data, telephone carrier location data, wireless network location data, or any combination thereof; encrypting, with the mobile device, at least a portion of the account data and the mobile device location data, resulting in at least one encrypted data packet; and transmitting, with the mobile device to the authentication system, the at least one encrypted data packet.

Clause 2: The computer-implemented method of clause 1, further comprising: receiving, at the authentication system, the at least one encrypted data packet; decrypting, at the authentication system, the at least one encrypted data packet to obtain the mobile device location data; comparing the mobile device location data with location data associated with a network address of the mobile device; and determining, at the authentication system, a risk assessment based on the comparison between the mobile device location data and the location data associated with the network address of the mobile device.

Clause 3: The computer-implemented method of clause 1 or 2, wherein the network address comprises an Internet Protocol address, and wherein the network address is obtained by the authentication system from a transaction request message transmitted from the mobile device to initiate the transaction.

Clause 4: The computer-implemented method of any of clauses 1-3, wherein the at least one encrypted data packet is encrypted based on a public key associated with the authentication system.

Clause 5: The computer-implemented method of any of clauses 1-4, wherein the public key associated with the authentication system is stored on the mobile device and/or received in the request.

Clause 6: The computer-implemented method of any of clauses 1-5, further comprising: in response to receiving the request from the authentication system, prompting a user of the mobile device to arrange the portable payment device in proximity to the mobile device, wherein the account data is obtained via near-frequency communication (NFC).

Clause 7: The computer-implemented method of any of clauses 1-6, wherein the at least one encrypted data packet and the transaction request message each comprise a timestamp, and wherein determining the risk assessment based on the comparison between the mobile device location data and the location data associated with the network address of the mobile device comprises: determining, based on the timestamps, a radius associated with the location data associated with the network address of the mobile device; and determining whether the mobile device location data is within the radius.

Clause 8: A system for authenticating a transaction, comprising at least one processor programmed or configured to: receive, on a mobile device associated with a user, a request from an authentication system, the request associated with a transaction requested by the user; obtain, with the mobile device from a portable payment device, account data via radio frequency communication; obtain, with the mobile device, mobile device location data comprising at least one of the following: GPS location data, telephone carrier location data, wireless network location data, or any combination thereof; encrypt, with the mobile device, at least a portion of the account data and the mobile device location data, resulting in at least one encrypted data packet; and transmit, with the mobile device to the authentication system, the at least one encrypted data packet.

Clause 9: The system of clause 8, wherein the at least one processor is further programmed or configured to: receive, at the authentication system, the at least one encrypted data packet; decrypt, at the authentication system, the at least one encrypted data packet to obtain the mobile device location data; compare the mobile device location data with location data associated with a network address of the mobile device; and determine, at the authentication system, a risk assessment based on the comparison between the mobile device location data and the location data associated with the network address of the mobile device.

Clause 10: The system of clause 8 or 9, wherein the network address comprises an Internet Protocol address, and wherein the network address is obtained by the authentication system from a transaction request message transmitted from the mobile device to initiate the transaction.

Clause 11: The system of any of clauses 8-10, wherein the at least one encrypted data packet is encrypted based on a public key associated with the authentication system.

Clause 12: The system of any of clauses 8-11, wherein the public key associated with the authentication system is stored on the mobile device and/or received in the request.

Clause 13: The system of any of clauses 8-12, wherein the at least one processor is further programmed or configured to: in response to receiving the request from the authentication system, prompt a user of the mobile device to arrange the portable payment device in proximity to the mobile device, wherein the account data is obtained via near-frequency communication (NFC).

Clause 14: The system of any of clauses 8-13, wherein the at least one encrypted data packet and the transaction request message each comprise a timestamp, and wherein determining the risk assessment based on the comparison between the mobile device location data and the location data associated with the network address of the mobile device comprises: determining, based on the timestamps, a radius associated with the location data associated with the network address of the mobile device; and determining whether the mobile device location data is within the radius.

Clause 15: A computer program product for authenticating a transaction, the computer program product comprising at least one non-transitory computer-readable medium including one or more instructions that, when executed by at least one processor, cause the at least one processor to: receive, on a mobile device associated with a user, a request from an authentication system, the request associated with a transaction requested by the user; obtain, with the mobile device from a portable payment device, account data via radio frequency communication; obtain, with the mobile device, mobile device location data comprising at least one of the following: GPS location data, telephone carrier location data, wireless network location data, or any combination thereof; encrypt, with the mobile device, at least a portion of the account data and the mobile device location data, resulting in at least one encrypted data packet; and transmit, with the mobile device to the authentication system, the at least one encrypted data packet.

Clause 16: The computer program product of clause 15, wherein the one or more instructions cause the at least one processor to: receive, at the authentication system, the at least one encrypted data packet; decrypt, at the authentication system, the at least one encrypted data packet to obtain the mobile device location data; compare the mobile device location data with location data associated with a network address of the mobile device; and determine, at the authentication system, a risk assessment based on the comparison between the mobile device location data and the location data associated with the network address of the mobile device.

Clause 17: The computer program product of clause 15 or 16, wherein the network address comprises an Internet Protocol address, and wherein the network address is obtained by the authentication system from a transaction request message transmitted from the mobile device to initiate the transaction.

Clause 18: The computer program product of any of clauses 15-17, wherein the at least one encrypted data packet is encrypted based on a public key associated with the authentication system.

Clause 19: The computer program product of any of clauses 15-18, wherein the public key associated with the authentication system is stored on the mobile device and/or received in the request.

Clause 20: The computer program product of any of clauses 15-19, wherein the one or more instructions cause the at least one processor to: in response to receiving the request from the authentication system, prompt a user of the mobile device to arrange the portable payment device in proximity to the mobile device, wherein the account data is obtained via near-frequency communication (NFC).

Clause 21: The computer program product of any of clauses 15-20, wherein the at least one encrypted data packet and the transaction request message each comprise a timestamp, and wherein determining the risk assessment based on the comparison between the mobile device location data and the location data associated with the network address of the mobile device comprises: determining, based on the timestamps, a radius associated with the location data associated with the network address of the mobile device; and determining whether the mobile device location data is within the radius.

Clause 22: A computer-implemented method for authenticating a transaction, comprising: receiving, at an authentication system, a transaction initiation message associated with a transaction, wherein the transaction initiation message comprises first location data associated with a network address of a mobile device used to initiate the transaction; generating and communicating, at the authentication system, a challenge message to the mobile device; receiving, at the authentication system and from the mobile device, at least one encrypted data packet comprising encrypted account data associated with a portable payment device obtained from the mobile device via radio frequency communication and encrypted second location data obtained by the mobile device by at least one of the following: GPS location data, telephone carrier location data, wireless network location data, or any combination thereof; comparing, at the authentication system, the second location data with the first location data; and determining, at the authentication system, a risk assessment based on the comparison between the second location data and the first location data.

Clause 23: The computer-implemented method of clause 22, further comprising: decrypting, at the authentication system, the at least one encrypted data packet to obtain the second location data.

Clause 24: The computer-implemented method of clause 22 or 23, wherein the network address comprises an Internet Protocol address.

Clause 25: The computer-implemented method of any of clauses 22-24, wherein the at least one encrypted data packet is encrypted based on a public key associated with the authentication system.

Clause 26: The computer-implemented method of any of clauses 22-25, wherein the public key associated with the authentication system is stored on the mobile device and/or received in the challenge message.

Clause 27: The computer-implemented method of any of clauses 22-26, wherein the challenge message prompts the user of the mobile device to arrange the portable payment device in proximity to the mobile device, wherein the account data is obtained via near-frequency communication (NFC).

Clause 28: The computer-implemented method of any of clauses 22-27, wherein the at least one encrypted data packet and the transaction initiation message each comprise a timestamp, and wherein determining the risk assessment based on the comparison between the second location data and the first location data comprises: determining, based on the timestamps, a radius associated with first location data; and determining whether the second location data is within the radius.

Clause 29: The computer-implemented method of any of clauses 22-28, wherein the transaction initiation message comprises account data associated with the portable payment device, wherein the authentication system: compares the account data associated with the portable payment device from the transaction initiation message with the account data from the at least one encrypted data packet.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
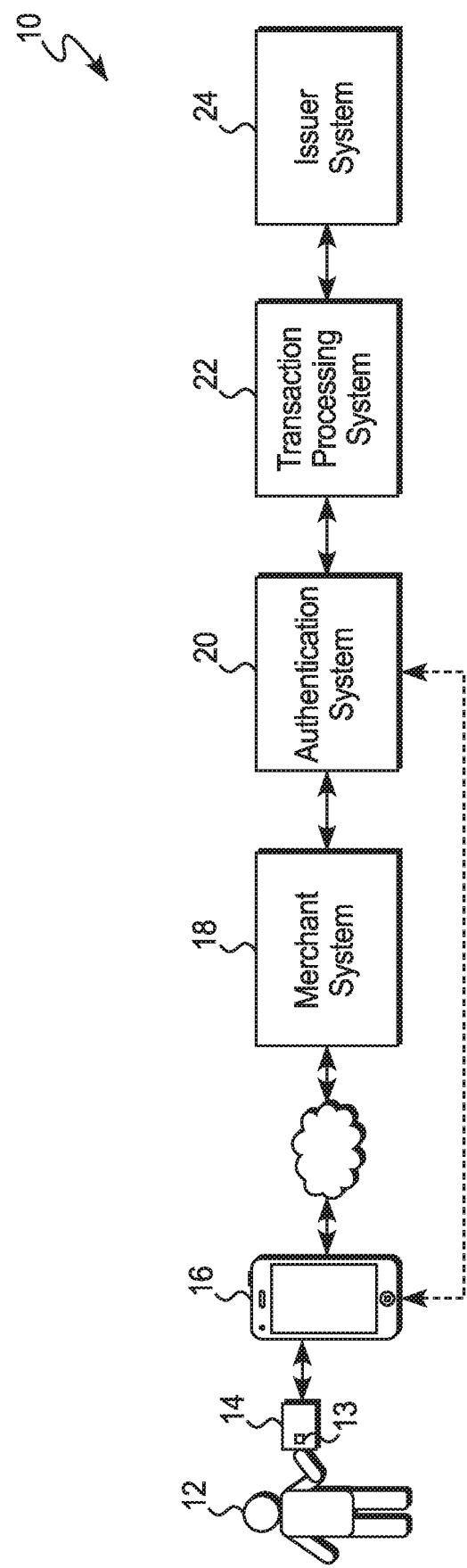
FIG. 1 is a schematic diagram of a system for authenticating a transaction according to some non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "card-present transaction" may refer to a payment transaction initiated with a payment device in which the cardholder physically presents the payment device at the time the payment transaction is initiated with the payment device. A non-limiting example of a card-present transaction is a payment transaction initiated at a brick-and-mortar retail store with a physical POS system, during which the cardholder physically presents the payment device to the merchant.

As used herein, the term "card-not-present transaction" or "CNP transaction" may refer to a payment transaction initiated with a payment device in which the cardholder does not or cannot physically present the payment device at the time the payment transaction is initiated with the payment device. Non-limiting examples of CNP transactions include transactions initiated by mail or facsimile or a payment transaction initiated over the telephone or the internet.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computing devices and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Non-limiting embodiments or aspects of the present disclosure are directed to a computer-implemented method, system, and computer program product for authenticating a transaction. Non-limiting embodiments or aspects enable a more reliable authentication for card-not-present (CNP) transactions. The system for authenticating a transaction does not rely solely on spoofable internet protocol (IP) data (which may be reversed to obtain a location) received from the user's mobile device (or other computing device) for the authentication, but rather utilizes actual location data obtained by the mobile device of the user. The actual location data may be compared to the IP address-derived location data to determine whether the transaction is potentially fraudulent. This actual location data may be more difficult for a fraud perpetrator to spoof. The comparison of the actual location data to the IP location data may take into account the time elapsed between receiving both sets of location data, so as to account for any potential discrepancies therebetween. The system may enable the CNP transaction to be less susceptible to fraud and more similar to a card-present transaction by enabling the mobile device to obtain account data associated with the portable payment device during authentication. The mobile device may obtain this account data through radio frequency communication, such as near-field communication (NFC). Obtaining the account data in this way during authentication allows the system to ascertain with higher certainty that the user does have possession of the physical payment device. The data obtained by the mobile device and communicated to the authentication system to perform the authentication may be encrypted to prevent the sensitive data from being obtained by a third party. Thus, the present disclosure includes a computer-implemented method, system, and computer program product that more effectively prevents fraud during a CNP transaction.

Referring to FIG. 1, a system 10 for authenticating a transaction according to some non-limiting embodiments is shown. The transaction may include a payment transaction between a user 12 and a merchant in which goods and/or services of the merchant are exchanged for a monetary value provided by the user 12. The payment transaction may be a CNP payment transaction in which the user 12 does not physically present his/her payment device 14 to the merchant for visual inspection. The payment transaction may be initiated by the user over the internet, for example.

The user 12 may have a payment device 14 associated with a payment account of the user 12 to initiate the transaction, the payment account issued to the user by an issuer, such as an issuer institution. The payment device 14 may include a chip 13 containing account data stored thereon that is associated with the payment account for the user 12, wherein the account data includes data used to process (e.g., authenticate, authorize, clear, and/or settle) payment transactions. Non-limiting examples of account data include, but are not limited to: an account identifier (e.g., a PAN and/or a tokenized PAN), cardholder name, cardholder contact information, payment device expiration date, card verification value (cvv) code, account balance, account limit, data elements defined by ISO 8583, and/or the like.

The chip 13 may be enabled to communicate the account data stored thereon via radio frequency communication, such as NFC communication or another form of short-range or proximate communication methods, although other forms of communicating the account data may be used. In this way, the chip 13 may include an NFC-enabled chip. The payment device may be portable, such as a payment card, mobile device, or other portable payment instrument.

With continued reference to FIG. 1, the user 12 may initiate a payment transaction using a computing device 16, such as a mobile device. The computing device 16 may be a smartphone of the user 12. The computing device 16 may communicate with a merchant system 18 operated by or on behalf of the merchant engaging in the payment transaction by the computing device 16 communicating a transaction request to the merchant system 18. The transaction request may be communicated to the merchant system 18 over the internet in an example in which the user 12 accesses the merchant system 18 through a webpage or mobile application. The payment transaction may be initiated and the transaction request communicated to the merchant system 18 using any suitable method. The payment transaction may be initiated using a mobile application running on the computing device 16. In some non-limiting embodiments, the payment transaction may be initiated using an electronic wallet of the user 12 running on the computing device 16. The payment transaction may be initiated by the user 12 visiting a website of the merchant. The payment transaction may be initiated using account data associated with the payment device 12 that is stored on the computing device 16 of the user and/or the user 12 may enter the account data into data fields displayed on the computing device 16 during a check-out process. In addition to account data, the transaction request may include first location data. The first location data may include a network address of the computing device 16, such as an internet protocol (IP) address of the computing device 16 initiating the transaction. The network address may correspond to a geographic location thereof or be used to determine a geographic location thereof. The first location data may also be any other type of information that could be used to estimate a location of the user 12 and/or computing device 16. Other data associated with the computing device 16 may be included in the transaction request, such as a device ID.

With continued reference to FIG. 1, in response to receiving the transaction request, the merchant system 18 may generate and communicate a transaction initiation message to an authentication system 20 to cause the payment transaction to be processed. The authentication system 20 may be operated by or on behalf of a payment gateway, a transaction service provider, an acquirer, an issuer, and/or any other authenticating entity associated with the payment account of the user 12 or with the merchant. The transaction initiation message may include at least a portion of the data included in the transaction request, such as the first location data of the computing device 16. The transaction initiation message may further include a timestamp associated with the time the transaction initiation message was sent by the computing device 16 and/or the authentication system 20 may apply a timestamp to the transaction initiation message based on when the transaction initiation message was received.

With continued reference to FIG. 1, in response to receiving the transaction initiation message, the authentication system 20 may generate a challenge message to cause authentication of the payment transaction. The challenge message may be communicated by the authentication system 20 to the computing device 16 of the user 12. The authentication system 20 may communicate the challenge message to the computing device 16 directly or, in other examples, indirectly through the merchant system 18 or other intermediary device or system.

In non-limiting embodiments, in response to receiving the challenge message the computing device 16 may generate at least one encrypted data packet. The encrypted data packet may include account data associated with the payment account and second location data.

Figure 2:
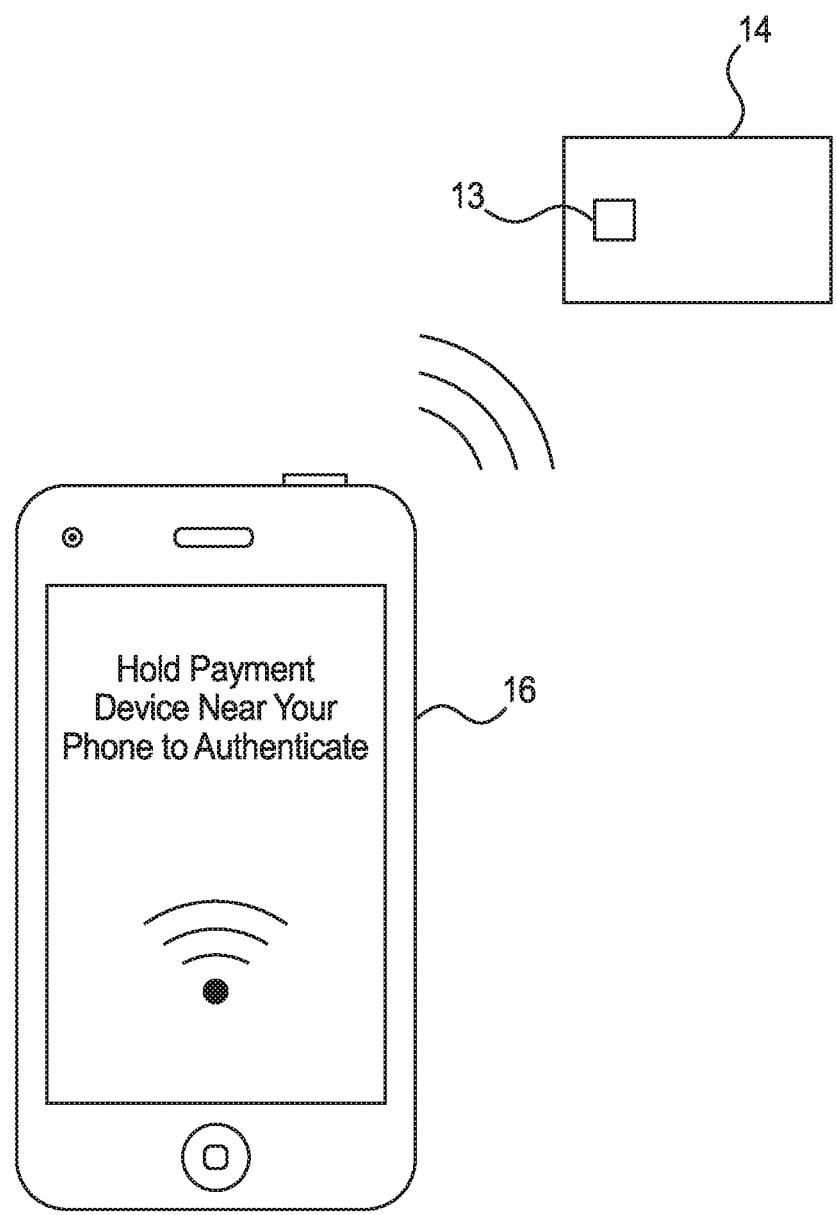
FIG. 2 is a schematic diagram of a mobile device obtaining account data from a portable payment device via radio frequency communication according to some non-limiting embodiments.

The computing device 16 may obtain the account data via a short-range radio frequency communication (e.g., NFC or some other like protocol) with the payment device 14. The computing device 16 may be enabled for such communication by including radio communication functionality therein. For example, the computing device 16 may include a mobile application or web browser that invokes a native library on the computing device's 16 operating system that enables such communication. Such communication may include, for example, invoking a Java contactless communication API. As shown in FIGS. 1 and 2, the computing device 16 may include a GUI to prompt the user 12 to arrange or position the payment device 14 proximate to the computing device 16 such that the account data associated with the portable payment device 14 may be obtained from the chip 13 via radio frequency communication. Obtaining the account data from the payment device 14 provides for an extra authentication factor to verify that the user 12 has possession of the physical payment device 12 associated with the payment account.

In non-limiting embodiments, the computing device 16 may obtain the second location data. The second location data may be location data associated with the computing device 16 at the time the challenge message is received. The second location data may be obtained by the computing device 16 using any suitable arrangement. In some non-limiting embodiments, the computing device 16 includes a GPS receiver enabled to determine the geographic location of the computing device 16 in response to receiving the challenge message. In some non-limiting embodiments, the computing device 16 may determine the geographic location of the computing device 16 in response to receiving the challenge message using the service provider's (e.g., cell phone service providers) network infrastructure, including but not limited to using telephone carrier location data (e.g., cell phone location data) based on measuring power levels and/or antenna patterns and data associated with the base station with which the computing device 16 is communicating. In some non-limiting embodiments, the computing device 16 may determine the geographic location of the computing device 16 in response to receiving the challenge message using wireless network location data (e.g., Wi-Fi data location data). Other such geolocation techniques may be used and/or combinations of the above-described techniques may be used.

The computing device 16 may obtain the second location data using suitable hardware and/or software that is embedded in the computing device 16. The second location data may be obtained without user 12 intervention, such that the computing device 16 obtains the second location data without user input. The computing device 16 may prevent the user from inputting, editing, and/or otherwise tampering with the obtained second location data. In some non-limiting embodiments or aspects, a location history e.g., a GPS location history or other location history, associated with the computing device 16 may be obtained to determine whether spoofed GPS location data has been included as the second location data. In some non-limiting embodiments or aspects, previous mobile payments made via the same payment device may be mapped based on time and compared to the GPS location history associated with the computing device 16 to determine whether spoofed GPS location data has been included as the second location data; for example, if the locations of the past mobile payments are not proximate the corresponding GPS location history for the computing device 16, the second location data may be spoofed.

With continued reference to FIG. 1, the computing device 16 may encrypt at least a portion of the obtained account data associated with the payment account and second location data to form at least one encrypted data packet. Any suitable encryption technique may be used. It will be appreciated that, in some examples, the second location data may be separately encrypted in a separate encrypted data packet. The computing device 16 may encrypt the account data associated with the payment account and second location data based on a public key associated with the authentication system 20, a transaction processing system 22, and/or an issuer system 24 of an issuer associated with the payment account. The public key may be communicated to the computing device 16 by the authentication system 20, the transaction processing system 22, and/or the issuer system 24 and stored on the computing device 16. The public key may be communicated to the computing device 16 in the challenge message and/or before the challenge message associated with a payment transaction is received. In some examples, even though the public key is the "public" component of a public/private key pair, the value of the key may be hidden from the user 12 by being embedded in software code, encrypted using another layer of cryptography, and/or the like. Moreover, the content of the data packet may be combined prior to encryption or, in other examples, the data itself may be first encrypted before being combined into one or more data packets.

With continued reference to FIG. 1, the computing device 16 may communicate the encrypted data packet including the account data associated with the payment account and second location data to the authentication system 20. The encrypted data packet may identify the public key and/or data associated with the encryption protocol such that an appropriately corresponding private key can be identified to decrypt the same. The encrypted data packet may further include a timestamp associated with the time the encrypted data packet was sent by the computing device 16 and/or the authentication system 20 may apply a timestamp to the encrypted data packet based on when the encrypted data packet was received. The timestamp may include a time at which the second location data and/or the account data was obtained.

With continued reference to FIG. 1, in response to receiving the encrypted data packet, the authentication system 20 may analyze the encrypted data packet to authenticate the payment transaction. The payment transaction may be authenticated by verifying that the user 12 initiating the payment transaction is an authorized user. The encrypted data packet may be analyzed without decrypting the encrypted data therein and/or the encrypted data packet may be analyzed after the encrypted data has been decrypted.

Analyzing the encrypted data packet may include comparing the account data contained in the encrypted data packet with the account data contained in the transaction initiation message. In response to determining that the account data contained in the encrypted data packet fully or at least partially matches the account data contained in the transaction initiation message, the authentication system 20 may determine that the user 12 possess the physical payment device 14 associated with the payment account by a confidence level, which may be used as a factor for the risk assessment performed by the authentication system 20 described hereinafter. In response to determining that the account data contained in the encrypted data packet does not match the account data contained in the transaction initiation message, either fully or partially, the authentication system 20 may determine that the user 12 may not possess the physical payment device 14 associated with the payment account by a confidence level, which may be used as a factor for the risk assessment performed by the authentication system 20 described hereinafter.

Figure 3:
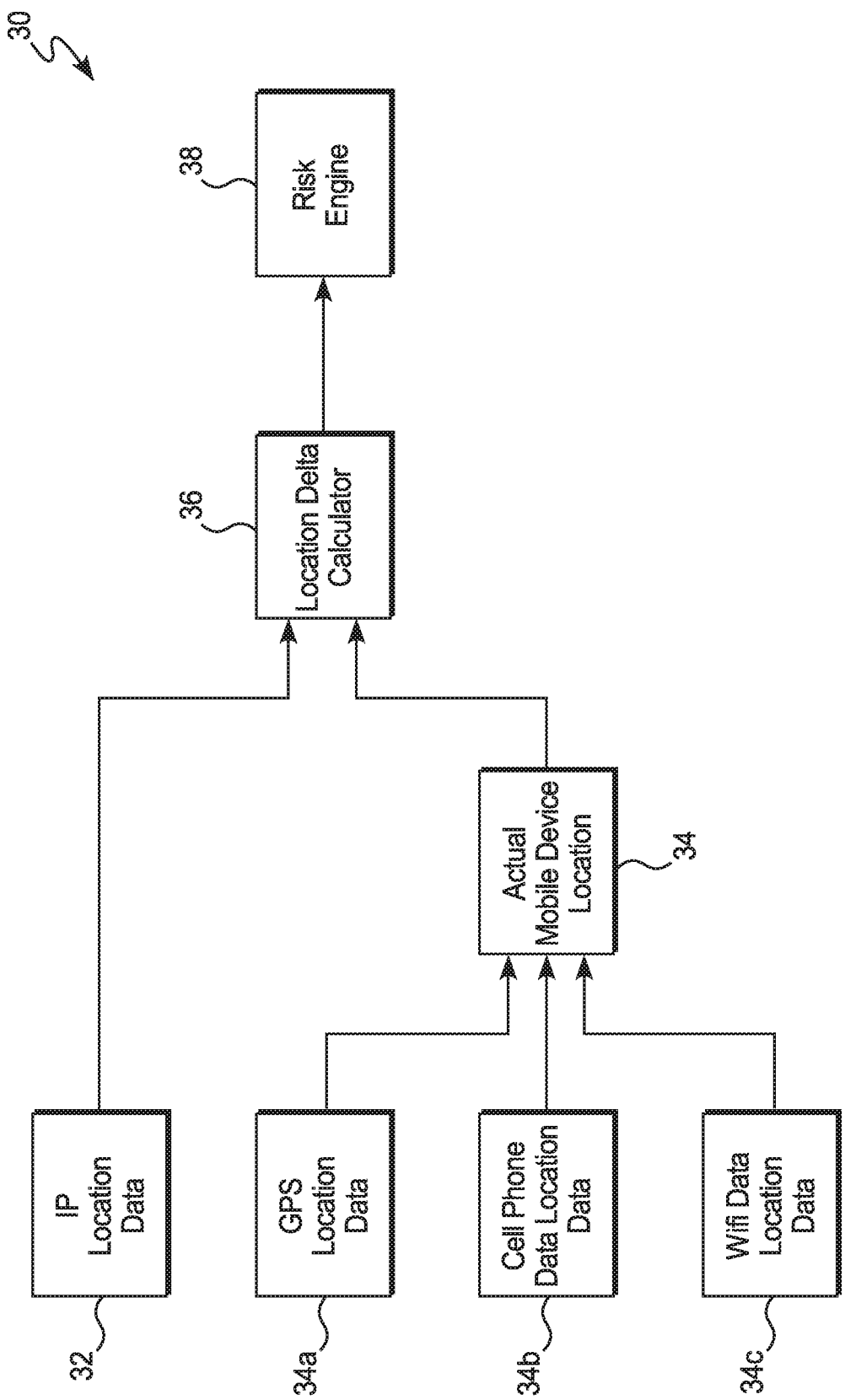
FIG. 3 is a schematic diagram of a system for determining a risk assessment according to some non-limiting embodiments.

Referring to FIGS. 1 and 3, analyzing the encrypted data packet may include comparing the first location data (e.g., received from the transaction initiation message) with the second location data (e.g., received from the encrypted data packet). A non-limiting embodiment of a system 30 for determining a risk assessment is shown in FIG. 3. The system 30 may be configured to compare the first location data with the second location data.

As shown in FIG. 3, the system 30 may include the IP location data 32 (e.g., the network address) associated with the computing device 16 communicating the transaction request, which may be the first location data included in the transaction initiation message. The system 30 may also include the actual mobile device (computing device 16) location data 34, which may be the second location data included in the encrypted data packet. The actual mobile device location data 34 may include one or more of GPS location data 34a, cell phone data location data 34b, and/or Wi-Fi data location data as previously described. The IP location data 32 and the actual mobile device location data 34 may be communicated to a location data calculator 36, which may be a software and/or hardware component of the authentication system 20. For example, the location data calculator 36 may be a software function or a processor configured to carry out the process. The location data calculator 36 may determine a distance between the IP location data 32 and the actual mobile device location data 34 (e.g., the delta distance). The delta distance may be communicated to a risk engine 38 which may be a software and/or hardware component of the authentication system 20. For example, the risk engine 38 may be a software function or a processor configured to carry out the process.

With continued reference to FIG. 3, the risk engine 38 may determine, based on the timestamps in the transaction initiation message and the encrypted data packet, a radius around the first location data associated with the IP location data 32. The radius may be determined based on risk-tolerance rules associating a time gap between the transaction initiation message and the encrypted data packet with an expected possible distance travelled by the user 12. The radius may include an acceptable delta distance from the IP location data 32 which, if the actual mobile device location data 34 is within the threshold delta distance (e.g., within the radius), the authentication system 20 may authenticate the user 12 by verifying that the user 12 initiating the payment transaction with the mobile device 16 is the same individual as the user 16 communicating the encrypted data packet. The risk engine 38 may determine whether the actual mobile device location data 34 is within the radius.

The radius may be determined based on the time difference between the timestamp in the transaction initiation message and the timestamp in the encrypted data packet. A small time difference between the timestamp in the transaction initiation message and the timestamp in the encrypted data packet may correspond to a smaller radius (e.g., within a threshold delta distance) compared to a larger time difference between the timestamp in the transaction initiation message and the timestamp in the encrypted data packet. This feature may account for the user 12 physically moving between the time the transaction initiation message is communicated and the time the encrypted data packet is communicated.

Figure 4:
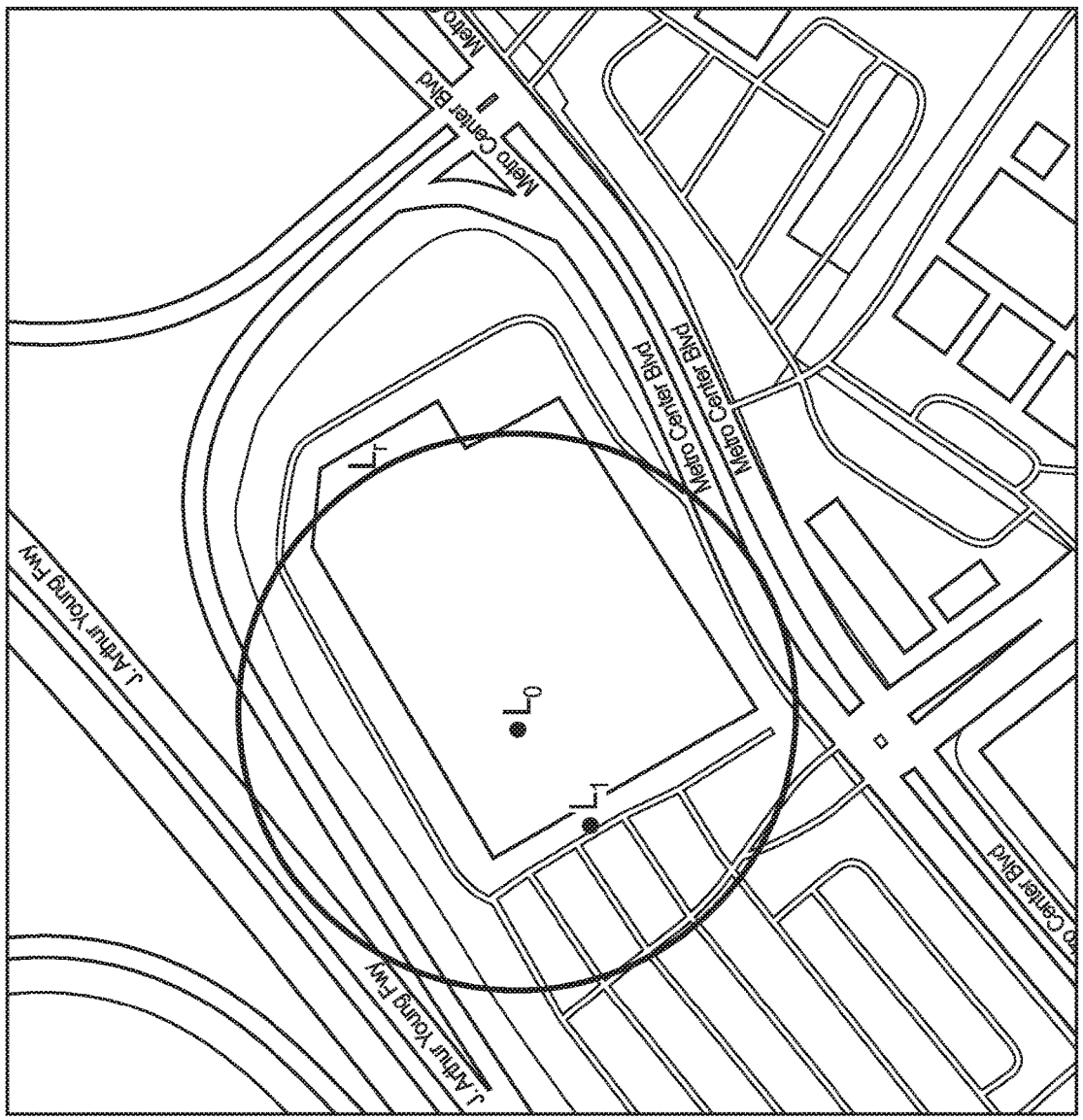
FIG. 4 is a schematic diagram of user location delta as evaluated by a risk assessment system according to some non-limiting embodiments.

Referring to FIG. 4, a map of a user location delta is shown according to some non-limiting embodiments. As shown in the map in FIG. 4, the point $L_0$ corresponds to the IP location data received in the transaction initiation message. The point $L_1$ corresponds to the actual mobile device location data received in the encrypted data packet. The circle having the radius $L_r$ corresponds to the radius determined by the risk engine based on the timestamps in the transaction initiation message and the encrypted data packet. In this non-limiting example, $L_1$ is within $L_r$, such that the risk engine 38 may determine that the user 12 is within the threshold delta distance to authenticate the transaction or to use as a factor for authenticating the transaction.

Referring back to FIG. 1, the authentication system 20 may determine a risk assessment to authenticate the payment transaction. The risk assessment may include the previously described comparison of the account data contained in the encrypted data packet with the account data contained in the transaction initiation message. This comparison may be the sole factor of the risk assessment or one of a plurality of factors in the risk assessment. The risk assessment may include the previously described comparison of the first location data and the second location data. This comparison may be the sole factor of the risk assessment or one of a plurality of factors in the risk assessment. The authentication system may determine that the payment transaction is validly being initiated by the user 12 of the payment account (e.g., resulting in authentication) or is being fraudulently initiated by someone other than the user of the payment account (resulting in non-authentication) based on this data and/or additional relevant authentication data.

In response to determining that the payment transaction is non-authenticated, the authentication system 20 may terminate processing of the payment transaction. In response to determining that the payment transaction is non-authenticated, the authentication system 20 may generate and communicate a fraud alert message to the computing device 16, the merchant system 18, the transaction processing system 22, and/or the issuer system 24 to cause a fraud prevention protocol to be initiated.

In response to determining that the payment transaction is authenticated, the authentication system 20 may initiate further processing (e.g., authorize, clear, and/or settle). In some non-limiting embodiments, the further processing may be performed in parallel with the above-described authentication protocol by the authentication system 20, while in other non-limiting embodiments the further processing may be performed after the payment transaction has been authenticated using the above-described authentication protocol by the authentication system 20.

The above described authentication protocol may be invoked in the processing of every transaction handled by a particular transaction processing system and/or issuer system or, in other examples, the authentication protocol may be selectively invoked in the processing of certain transactions handled thereby. For example, the authentication protocol may be invoked only for payment transactions engaged in by certain merchants or certain users. For example, a user or a merchant may opt-in to the above-referenced authentication protocol as part of a program for further fraud protection. For example, a user or merchant having past or recent suspected fraudulent activity associated therewith may warrant inclusion of the authentication protocol during the processing of transactions. The authentication protocol may be invoked in the processing of certain transactions based on an initial authentication assessment, such that only transactions having a higher likelihood of being fraudulent are processed using the authentication protocol. The authentication protocol may be included in processing certain types of transactions, such as CNP payment transactions initiated using a mobile device of a user. The authentication protocol may be included based on a risk assessment on the IP address of the computing device, such that potentially suspicious IP addresses may invoke the authentication protocol.

With continued reference to FIG. 1, the authentication system 20 (and/or the merchant system 18) may communicate a transaction processing message to the transaction processing system 22 operated by or on behalf of the transaction service provider associated with the payment account of the user 12. The transaction processing message may cause the payment transaction to be further processed. The transaction processing message may include at least a portion of the account data included in the transaction initiation message and may include further data provided by the authentication system for processing the transaction. The transaction processing message may include an indicator as to whether the transaction has been authenticated.

In response to receiving the transaction processing message, the transaction processing system 22 may communicate an authorization request to the issuer system 24 operated by or on behalf of the issuer associated with the payment account of the user 12. The authorization request may include at least a portion of the data from the transaction processing message. The authorization request may cause the issuer system 24 to generate an authorization decision associated with the payment transaction. The authorization decision may be to approve the payment transaction, approve the payment transaction in part, or decline the payment transaction. The issuer system 24 may generate and communicate an authorization response to the transaction processing system 22. The authorization response may include the authorization decision. The transaction processing system 22 may communicate the authorization decision to the merchant system 18 directly or indirectly through the authentication system 20. The authorization decision may be communicated by the merchant system 18 to the computing device 16.

As shown in FIG. 1, the authentication system 20, the transaction processing system 22, and the issuer system 24 are depicted as separate systems. However, in some non-limiting embodiments, the authentication system 20, the transaction processing system 22, and/or the issuer system 24 may be the same system, and may be operated by or on behalf of the same entity. In some non-limiting embodiments, the system 10 may further include an acquirer system (not shown in FIG. 1) enabled to perform functions on behalf of an acquirer institution.

Figure 5:
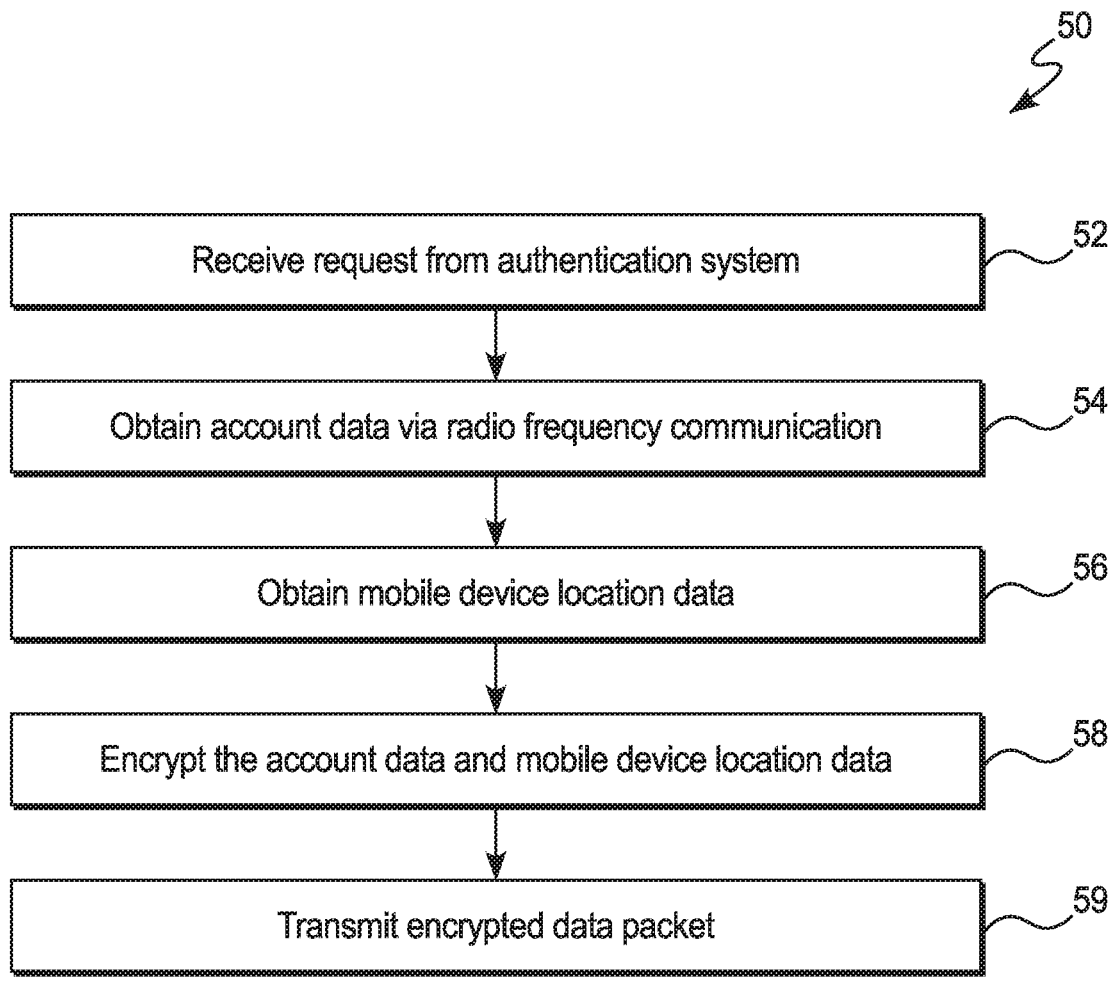
FIG. 5 is a step diagram of a method for authenticating a transaction according to some non-limiting embodiments.

Referring to FIG. 5, a method 50 for authenticating a transaction is shown according to some non-limiting embodiments. It will be appreciated that the steps and order of steps shown in FIG. 5 are for example only and that, in non-limiting embodiments, a different order of steps, fewer steps, and/or additional steps may be employed. At a step S2, the computing device of the user may receive a request (challenge request) from the authentication system. The request may be associated with a payment transaction initiated by the user.

At a step S4, the computing device of the user may obtain account data via radio frequency communication. At a step S6, the computing device of the user may obtain computing device location data. The computing device location data may include at least one of the following: GPS location data, telephone carrier location data, wireless network location data, or any combination thereof associated with the computing device. At a step S8, the computing device of the user may encrypt at least a portion of the account data and the mobile device location data, to generate at least one encrypted data packet. At a step S9, the computing device of the user may transmit the at least one encrypted data packet to the authentication system.

Figure 6:
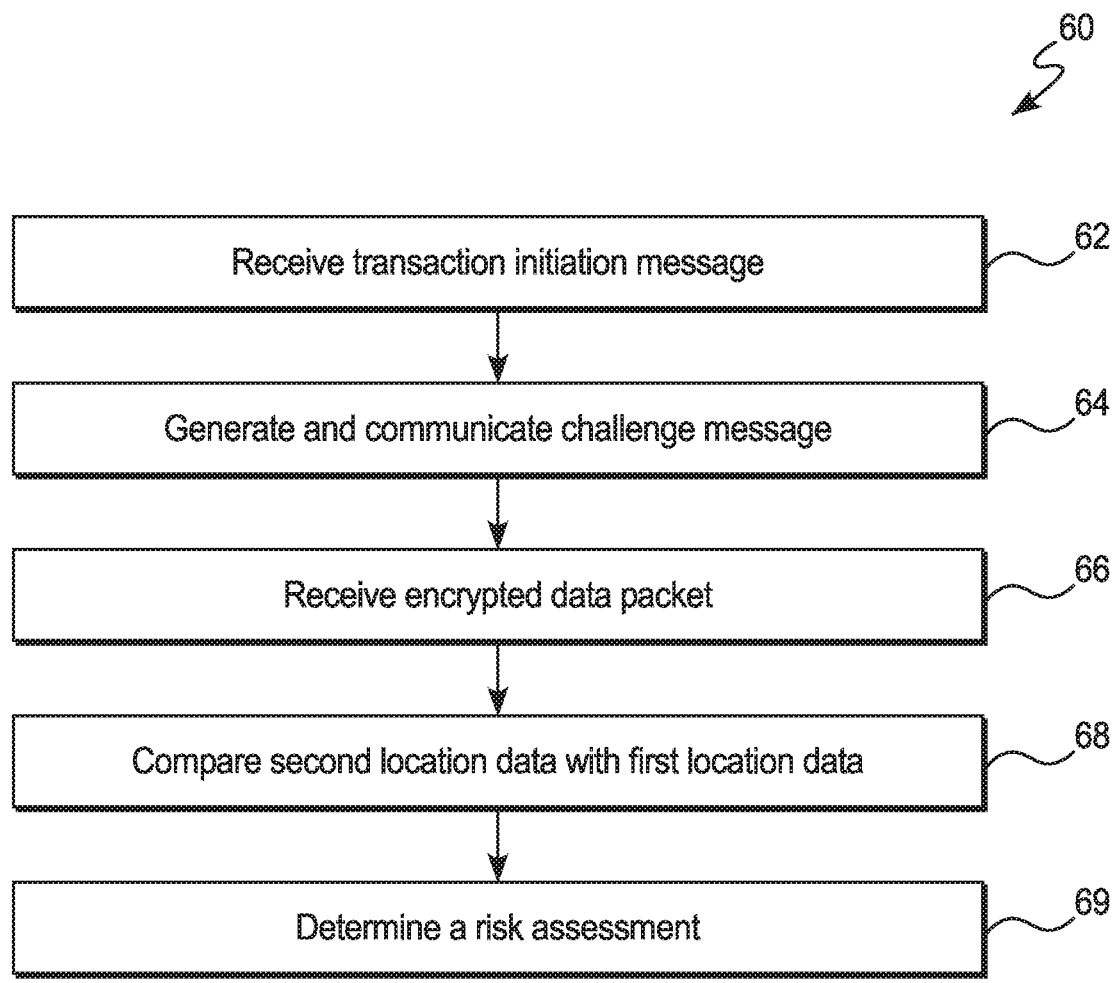
FIG. 6 is a step diagram of a method for authenticating a transaction according to some non-limiting embodiments.

Referring to FIG. 6, a method 60 for authenticating a transaction is shown according to some non-limiting embodiments. It will be appreciated that the steps and order of steps shown in FIG. 6 are for example only and that, in non-limiting embodiments, a different order of steps, fewer steps, and/or additional steps may be employed. At a step 62, the authentication system may receive a transaction initiation message associated with a payment transaction associated with the user. The transaction initiation message may include the first location data associated with a network address of the computing device used to initiate the transaction. At a step 64, the authentication system may generate and communicate a challenge message to the computing device.

With continued reference to FIG. 6, at a step 66 the authentication system may receive at least one encrypted data packet from the computing device. The encrypted data packet may include the encrypted account data associated with the portable payment device obtained from the computing device via radio frequency communication. The encrypted data packet may include the encrypted second location data obtained by the computing device by at least one of the following: GPS location data, telephone carrier location data, wireless network location data, or any combination thereof. At a step 68, the authentication system may compare the second location data with the first location data. At a step 69, the authentication system may determine the risk assessment based on the comparison between the second location data and the first location data.

Figure 7:
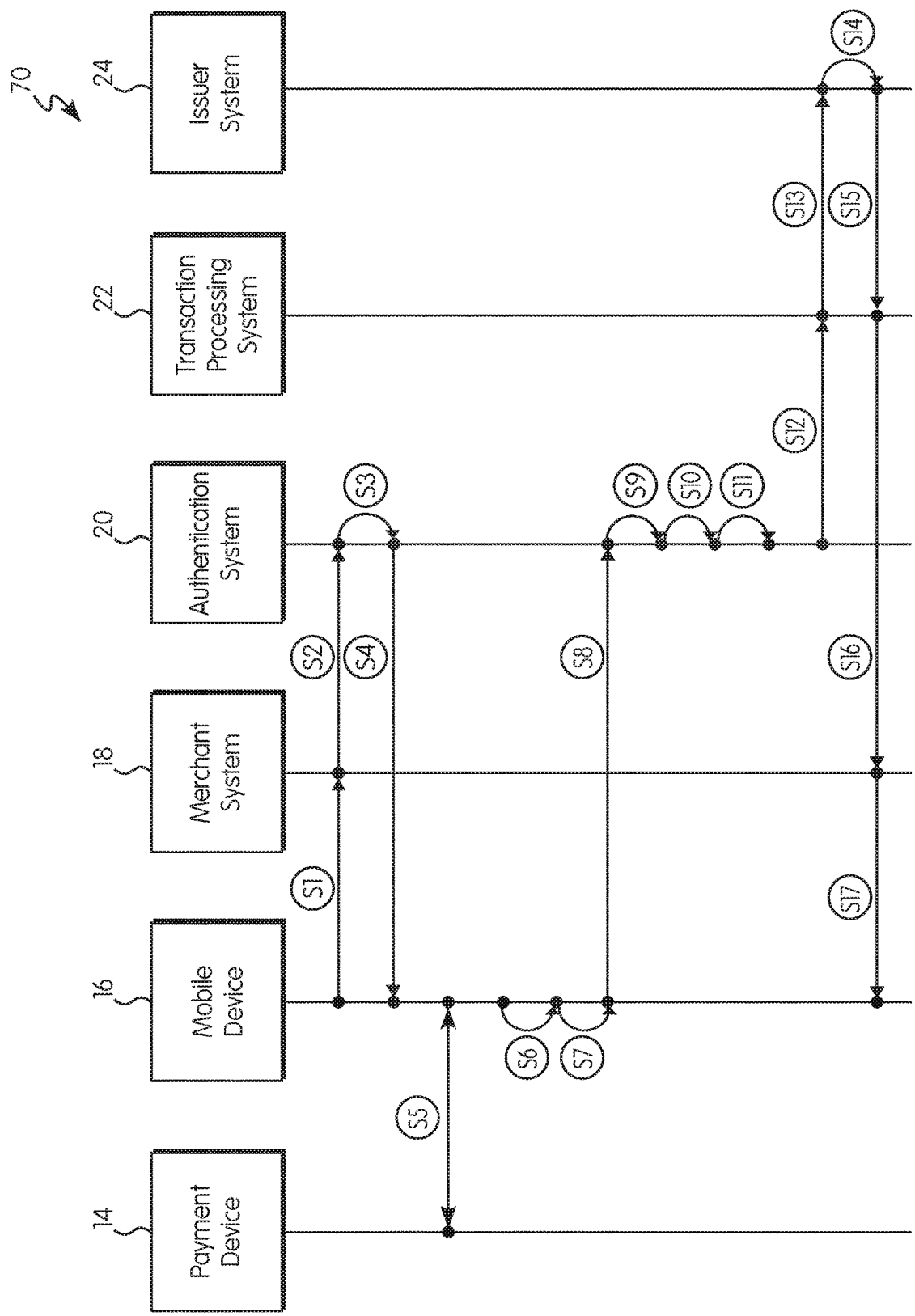
FIG. 7 is a process flow diagram of a method for authenticating a transaction according to some non-limiting embodiments.

Referring to FIG. 7, a sequence diagram for a method 70 for authenticating a transaction is shown according to some non-limiting embodiments. It will be appreciated that the steps and order of steps shown in FIG. 7 are for example only and that, in non-limiting embodiments, a different order of steps, fewer steps, and/or additional steps may be employed. At a step S1, the user may initiate a payment transaction with the computing device 16 (e.g., a mobile device). The computing device 16 may communicate the transaction request to the merchant system 18 to initiate the payment transaction. The transaction request may include the first location data.

Still referring to FIG. 7, at a step S2, the merchant system 18 may generate and communicate the transaction initiation message to the authentication system 20, the transaction initiation message including the first location data. In response to receiving the transaction initiation message at a step S3, the authentication system 20 may generate the challenge message. At a step S4, the authentication system 20 may communicate the challenge message to the computing device 16. At a step S5, the computing device 16 may obtain the account data via radio frequency communication with the payment device 14. At a step S6, the computing device 16 may obtain the second location data. At a step S7, the computing device 16 may encrypt at least a portion of the account data and the second location data to generate at least one encrypted data packet. At a step S8, the computing device 16 may communicate the encrypted data packet to the authentication system 20.

With continued reference to FIG. 7, at a step S9, the authentication system 20 may optionally decrypt the encrypted data packet. At a step S10, the authentication system 20 may compare the second location data with the first location data and/or the authentication system 20 may compare the account data contained in the transaction initiation message with the account data from the encrypted data packet. At a step S11, the authentication system 20 may determine a risk assessment (authentication determination) based on the comparison(s) from step S10. At a step S12, the authentication system 20 may generate and communicate the transaction processing message to the transaction processing system 22. At a step S13, the transaction processing system 22 may generate and communicate the authorization request to the issuer system 24. At a step S14, the issuer system 24 may generate the authorization decision associated with the payment transaction. At a step S15, the issuer system 24 may generate and communicate the authorization response containing the authorization decision to the transaction processing system 22. At a step S16, the transaction processing system 22 may communicate the authorization decision to the merchant system 18. At a step S17, the merchant system 18 may communicate the authorization decision to the computing device 16.

In a further, non-limiting embodiment or aspect, a computer program product for authenticating a transaction includes at least one non-transitory computer readable medium including program instructions that, when executed by at least one processor, cause the at least one processor to execute one of the previously-described methods. The at least one processor may include the mobile device, the merchant system, the authentication system, the transaction processing system, the issuer system, and/or the acquirer system.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for authenticating a card-not-present transaction, comprising:

storing, by a mobile device comprising a memory, a graphical user interface (GUI), and a global positioning system (GPS) receiver, account data for a payment device of a user in the memory;

transmitting, by the mobile device, a transaction request message to a merchant system, wherein the transaction request comprises the account data from the memory and an Internet Protocol (IP) address;

receiving, by an authentication system, a transaction initiation message from the merchant system, wherein the transaction initiation message comprises the transaction request and based on the received transaction initiation message, transmitting, by the authentication system, a challenge to the mobile device, wherein the challenge comprises a public key, and the transmitting the challenge further comprises displaying, on the GUI, a prompt for obtaining an account number from the payment device via an NFC connection with the payment device;

receiving, by the mobile device, the challenge and in response to the received challenge:
  receiving, by the mobile device, and based on the displayed prompt, the account number from the payment device via the NFC connection with the payment device;
  obtaining, by the mobile device, via the GPS receiver, location data; and
  generating, by the mobile device, an encrypted data packet, by encrypting the account number and the location data using the public key;

transmitting, by the mobile device, the generated encrypted data packet to the authentication system;

decrypting, by the authentication system, the encrypted data packet using a private key corresponding to the public key, and determining, by the authentication system, that the account number from the decrypted encrypted data matches the account data;

determining, by the authentication system, that a distance between a location of the IP address and a location of the mobile device according to the location data from the decrypted encrypted data is less than a threshold; and based on determining that the distance is less than the threshold and that the account number from the decrypted encrypted data matches the account data, authenticating, by the authentication system, the transaction.

2. A system for authenticating a card-not-present transaction, comprising:
  a mobile device comprising at least one first processor, a global positioning system (GPS) receiver, and a first memory storing executable instructions that when executed by the at least one first processor causes the at least one first processor to perform operations of:
    storing a graphical user interface (GUI) and account data for a payment device of a user in the first memory;
    transmitting a transaction request to a merchant system, wherein the transaction request comprises the account data from the first memory and an Internet Protocol (IP) address;
  an authentication system comprising at least one second processor and a second memory storing executable instructions that when executed by the at least one second processor causes the at least one second processor to perform operations of:
    receiving a transaction initiation message from the merchant system, wherein the transaction initiation message comprises the transaction request and based on the received transaction initiation message, transmitting a challenge to the mobile device, wherein the challenge comprises a public key, and the transmitting the challenge further comprises displaying, on the GUI, a prompt for obtaining an account number from the payment device via an NFC connection with the payment device;
  the first memory storing executable instructions that when executed by the at least one first processor causes the at least one first processor to further perform the operations of:
    receiving the challenge and in response to the received challenge:
      receiving, and based on the displayed prompt, the account number from the payment device via the NFC connection with the payment device;
      obtaining, via the GPS receiver, location data; and
      generating an encrypted data packet, by encrypting the account number and the location data using the public key;
    transmitting the generated encrypted data packet to the authentication system;
  the second memory storing executable instructions that when executed by the at least one second processor causes the at least one second processor to further perform the operations of:
    decrypting the encrypted data packet using a private key corresponding to the public key, and determining that the account number from the decrypted encrypted data matches the account data;
    determining that a distance between a location of the IP address and a location of the mobile device according to the location data from the decrypted encrypted data is less than a threshold; and
    based on determining that the distance is less than the threshold and that the account number from the decrypted encrypted data matches the account data, authenticating the transaction.

3. A computer program product for authenticating a card-not-present transaction comprising:
  a first non-transitory computer-readable medium of a mobile device, wherein the mobile device comprises a first memory, at least one first processor, and a global positioning system (GPS) receiver, storing executable instructions that when executed by the at least one first processor, causes the at least one first processor to perform the operations of:
    storing a graphical user interface (GUI) and account data for a payment device of a user in the first memory;
    transmitting a transaction request to a merchant system, wherein the transaction request comprises the account data from the first memory and an Internet Protocol (IP) address;
  a second non-transitory computer-readable medium of an authentication system, which comprises at least one second processor, storing executable instructions that when executed by the at least one second processor, causes the at least one second processor to perform the operations of:
    receiving a transaction initiation message from the merchant system, wherein the transaction initiation message comprises the transaction request and based on the received transaction initiation message, transmitting a challenge to the mobile device, wherein the challenge comprises a public key, and the transmitting the challenge further comprises displaying, on the GUI, a prompt for obtaining an account number from the payment device via an NFC connection with the payment device;
  the first non-transitory computer-readable medium of a mobile device, storing executable instructions that when executed by the at least one first processor, causes the at least one first processor to further perform the operations of:
    receiving the challenge and in response to the received challenge:

receiving, and based on the displayed prompt, the account number from the payment device via the NFC connection with the payment device;
obtaining, via the GPS receiver, location data; and
generating an encrypted data packet, by encrypting the account number and the location data using the public key;
transmitting the generated encrypted data packet to the authentication system;
the second non-transitory computer-readable medium of an authentication system, which comprises at least one second processor, storing executable instructions that when executed by the at least one second processor, causes the at least one second processor to further perform the operations of:
decrypting the encrypted data packet using a private key corresponding to the public key, and determining that the account number from the decrypted encrypted data matches the account data;
determining that a distance between a location of the IP address and a location of the mobile device according to the location data from the decrypted encrypted data is less than a threshold; and
based on determining that the distance is less than the threshold and that the account number from the decrypted encrypted data matches the account data, authenticating the transaction.

\* \* \* \* \*